United States Patent
Liu et al.

(10) Patent No.: US 12,142,048 B2
(45) Date of Patent: Nov. 12, 2024

(54) FREIGHT MANAGEMENT SYSTEMS AND METHODS

(71) Applicant: Kargo Technologies Corp., San Francisco, CA (US)

(72) Inventors: Bingyan Liu, Mountain View, CA (US); Rodrigo Barriuso de Juan, San Francisco, CA (US); Nicholas Su, San Francisco, CA (US); Charles Wood, San Francisco, CA (US); Maxwell C. Goldberg, San Francisco, CA (US); Daniel Fang, San Francisco, CA (US); Jonathan Zwiebel, San Francisco, CA (US); Samuel Lurye, San Francisco, CA (US)

(73) Assignee: Kargo Technologies Corporation, San Francisco, CA (US)

( * ) Notice: Subject to any disclaimer, the term of this patent is extended or adjusted under 35 U.S.C. 154(b) by 342 days.

(21) Appl. No.: 17/488,031

(22) Filed: Sep. 28, 2021

(65) Prior Publication Data

US 2023/0098677 A1    Mar. 30, 2023

(51) Int. Cl.
*G06V 20/52* (2022.01)
*G06Q 10/0835* (2023.01)
*H04N 23/56* (2023.01)
*H04N 23/90* (2023.01)

(52) U.S. Cl.
CPC ......... *G06V 20/52* (2022.01); *G06Q 10/0835* (2013.01); *H04N 23/56* (2023.01); *H04N 23/90* (2023.01)

(58) Field of Classification Search
CPC .. G06V 20/52; G06V 10/147; G06Q 10/0835; H04N 23/56; H04N 23/90
USPC .......................................................... 382/103
See application file for complete search history.

(56) References Cited

U.S. PATENT DOCUMENTS

| | | |
|---|---|---|
| 2003/0194134 A1 | 10/2003 | Wenzel et al. |
| 2007/0009159 A1 | 1/2007 | Fan |
| 2011/0158536 A1 | 6/2011 | Nakano et al. |
| 2013/0027775 A1 | 1/2013 | Zuniga et al. |
| 2013/0028519 A1 | 1/2013 | Zuniga et al. |
| 2014/0270467 A1* | 9/2014 | Blemel ............... G07D 7/2033 382/143 |
| 2016/0027200 A1 | 1/2016 | Corazza et al. |
| 2016/0055400 A1 | 2/2016 | Jorquera et al. |
| 2018/0038805 A1 | 2/2018 | Heikkiläet al. |
| 2019/0082110 A1* | 3/2019 | Jin ....................... H04N 13/243 |
| 2019/0108396 A1 | 4/2019 | Dal Mutto et al. |
| 2019/0262994 A1* | 8/2019 | Yuvaraj ................ B25J 13/089 |

(Continued)

FOREIGN PATENT DOCUMENTS

WO         2020124247        6/2020

*Primary Examiner* — Stephen P Coleman
(74) *Attorney, Agent, or Firm* — Raubvogel Law Office

(57) ABSTRACT

Example freight management systems and methods are described. In one implementation, a first sensor tower is located near a loading dock and includes multiple camera sensors that capture a first set of images of a freight item in the loading dock. A second sensor tower located near the loading dock captures a second set of images of the freight item. A computing device receives the first set of images and the second set of images. The computing device analyzes the first set of images and the second set of images to identify at least one object associated with the freight item.

23 Claims, 14 Drawing Sheets

(56) References Cited

U.S. PATENT DOCUMENTS

| | | |
|---|---|---|
| 2020/0104790 A1 | 4/2020 | Chung |
| 2020/0193591 A1* | 6/2020 | Kamiyama et al. |
| 2020/0226825 A1* | 7/2020 | Bian ..................... G06T 17/00 |
| 2020/0401617 A1 | 12/2020 | Spiegel et al. |
| 2021/0133666 A1 | 5/2021 | Eckman et al. |
| 2021/0174135 A1 | 6/2021 | Liu et al. |
| 2021/0248548 A1* | 8/2021 | Guhya ..................... G06T 7/70 |
| 2021/0366099 A1 | 11/2021 | Liao et al. |
| 2022/0067363 A1 | 3/2022 | Skoryukina et al. |
| 2023/0005257 A1 | 1/2023 | Wang et al. |

* cited by examiner

FREIGHT RECORD

900 — Truck ID: 2198
Arrived On Time at Facility 3328
Parked at: Dock F
Arrival: 10:23am, July 8, 2021
Departure: 10:42am
Temp: 76 F
Pallet ID: Q8R44936
Pallet Dimensions: 48x40 inches
Number of Boxes: 28
Air Quality: 73

FIG. 9

FREIGHT MANAGEMENT SYSTEMS AND METHODS

RELATED APPLICATIONS

This application is related to U.S. application Ser. No. 17/488,033 filed Sep. 28, 2021, which is incorporated herein by reference for all purposes.

TECHNICAL FIELD

The present disclosure relates to managing warehouse operations including the shipping and receiving of freight via a loading dock.

BACKGROUND

Warehouses and other buildings that ship and receive items often use loading docks for the transfer of those items between the warehouse and trucks that deliver and receive any number of items. In some situations, forklifts and other equipment may unload items from trucks into the warehouse and may load items from the warehouse onto the trucks.

It is important to track the movement of these items, confirm that a received shipment contains the proper items, check for damaged items in a received shipment, check for evidence of tampering with the items, and the like. Often, these activities are performed manually by a human operator who inspects the received shipment and compares it to a bill of lading or other tracking system. These manual operations are typically slow and prone to error.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 9 illustrates an embodiment of a freight record for a particular freight item that was scanned using the systems and methods discussed herein.

DETAILED DESCRIPTION

Figure 1:
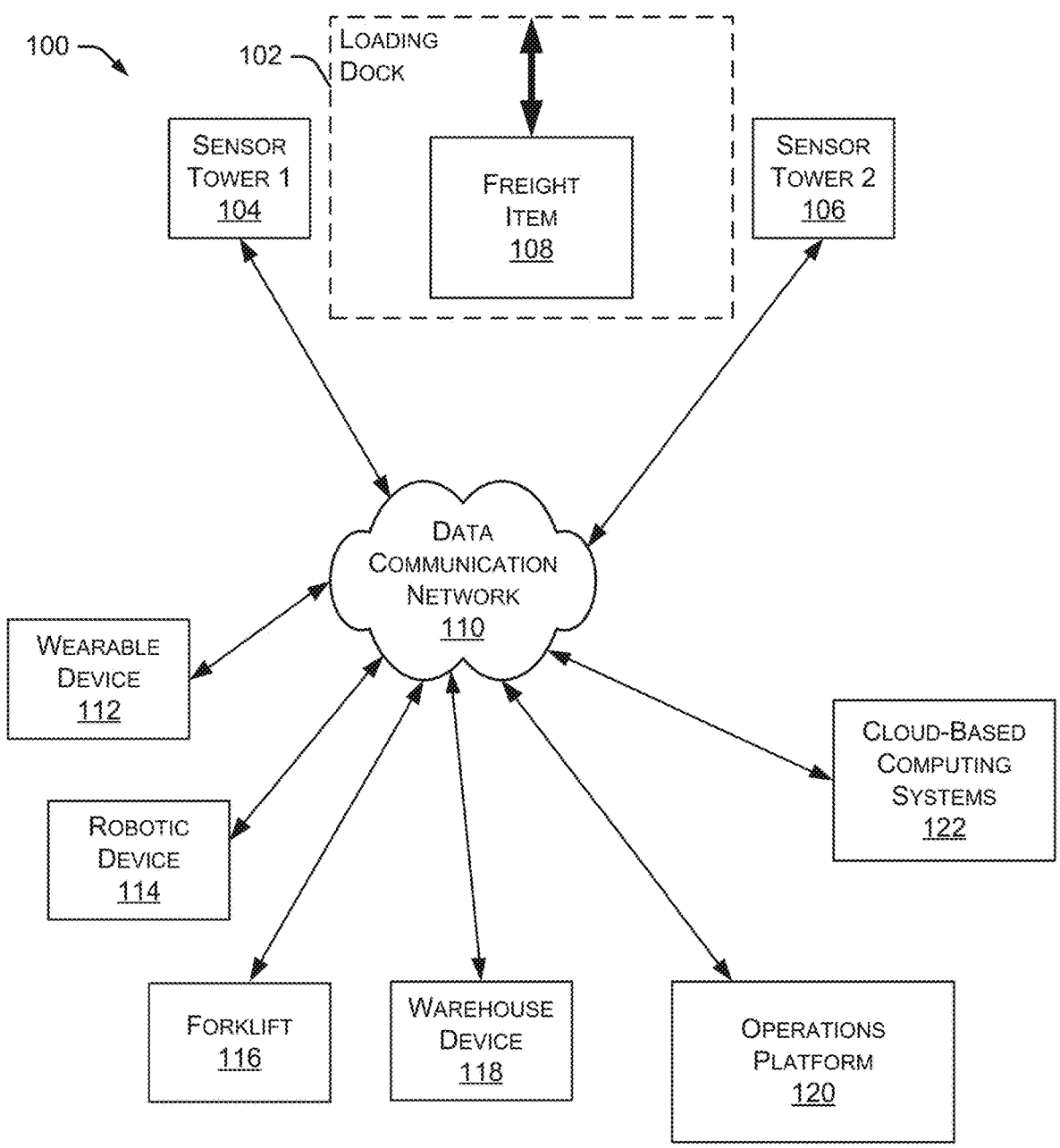
FIG. 1 is a block diagram illustrating an environment within which an example embodiment may be implemented.

In some embodiments, the systems and methods discussed herein perform various activities associated with warehouse operations, such as incoming and outgoing freight and similar items. In particular embodiments, these systems and methods are associated with identifying, analyzing, and tracking freight items moving through a loading dock at a warehouse or other facility.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein for purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

FIG. 1 is a block diagram illustrating an environment 100 within which an example embodiment may be implemented. As shown in FIG. 1, a first sensor tower 104 and a second sensor tower 106 are positioned on opposite sides of a loading dock 102. In some embodiments, environment 100 is a warehouse, manufacturing facility, sorting facility, or any other facility with at least one loading dock. Although two sensor towers 104, 106 are shown in FIG. 1, other embodiments may include a single sensor tower located on one side of loading dock 102. In some embodiments, loading dock 102 may have a door (not shown) to control access to loading dock 102 from outside the facility.

Any number of freight items 108 may travel across loading dock 102, such as freight items 108 being loaded onto a truck or other vehicle, and freight items 108 being received from a truck or other vehicle. Freight item 108 may include any type of container, collection of objects, or other items that can be shipped and passed through loading dock 102. Example freight items 108 include palletized objects, racks carrying one or more objects, single large items (such as large containers of liquid or dry food items, oil drums, and vehicle engines), multiple items shrink-wrapped or banded together, and the like. In some embodiments, a forklift, robot, or other machine moves freight item 108 across loading dock 102 when unloading or loading a truck or other vehicle.

In operation, freight items 108 are moved across loading dock 102 at a normal speed of operation of a forklift or other machine moving the freight items. Sensor towers 104 and 106 have multiple cameras that can scan freight items 108 in real-time as the forklift or other machine crosses loading dock 102 at its normal operating speed. Thus, sensor towers 104 and 106 can be installed at an existing loading dock 102 without disrupting the normal operation of receiving and shipping freight items 108. As discussed in greater detail herein, sensor towers 104 and 106 include multiple cameras that scan freight items 108 passively as they travel across loading dock 102.

In some embodiments, particular sensor towers can scan a variety of freight items without requiring reconfiguration between different types of freight items. For example, one or more sensor towers can scan a palletized freight item, followed by scanning a single container freight item, then followed by a rack freight item. These different types of freight items can be scanned by one or more sensor towers consecutively without making any changes to the sensor towers. Thus, the adaptable sensor towers allow freight to be loaded and unloaded regardless of the various types of freight associated with a particular truck.

As shown in FIG. 1, sensor towers 104 and 106 may be coupled to other devices and systems via a data communication network 110. In some embodiments, data communication network 110 includes any type of network topology using any communication protocol. Additionally, data communication network 110 may include a combination of two or more communication networks. In some embodiments, data communication network 110 includes a cellular communication network, the Internet, a local area network, a wide area network, or any other communication network.

In the example of environment 100, sensor towers 104 and 106 are coupled to communicate with one or more wearable devices 112, one or more robotic devices 114, one or more forklifts 116, one or more warehouse devices 118, one or more operations platforms 120, and one or more cloud-based computing systems 122. Wearable devices 112 may include any device worn by a warehouse worker (e.g., a forklift operator) to provide feedback (e.g. audible, visual, or haptic feedback) related to one or more warehouse activities. Example information that may be communicated to warehouse personnel via wearable device 112 includes time discrepancies in the items that are passing through sensor towers 104 and 106, where items are being transported to or from, identification of visual defects in one or more items, identification of unreadable labels or other markings, or one of sensor towers 104 and 106 being unable to identify objects associated with a freight item.

Robotic devices 114 may include any device that assists with facility operations, such as moving objects, scanning objects, locating freight items, and the like. Forklift 116 may include an autonomous forklift or a human-operated forklift. Warehouse device 118 may include any other device that manages logistics within a warehouse and any other tasks necessary to manage inventory, shipping, receiving, scheduling, and the like. Operations platform 120 may provide various logistics and operation information to one or more systems and personnel. Additional details regarding operations platform 120 are discussed herein. Cloud-based computing system 122 may include any number of computing devices, such as servers, that can perform various tasks, activities, data storage, and the like. As discussed herein, cloud-based computing system 122 may perform analysis of images captured by sensor towers 104 and 106, and identification of one or more objects associated with freight item 108

As discussed herein, each sensor tower 104 and 106 includes a separate computing device that performs various tasks, such as analyzing captured images and identifying one or more objects associated with freight item 108. In some embodiments, sensor towers 104 and 106 may also access one or more cloud-based computing systems 122 to perform at least some of the analysis of captured images and identification of objects associated with freight item 108. In other embodiments, sensor towers 104 and 106 may not include their own computing devices. In this situation, sensor towers 104 and 106 may rely on one or more cloud-based computing systems 122 to perform the analysis of captured images and identification of objects associated with freight item 108.

In another embodiment, sensor tower 104 has its own computing device that analyzes captured images and identifies one or more objects associated with freight item 108. However, in this embodiment, sensor tower 106 does not have its own computing device. In this situation, the computing device in sensor tower 104 can perform the analysis of images captured by sensor tower 106 and identify objects in the images captured by sensor tower 106. For example, sensor tower 106 may communicate its captured images to sensor tower 104 for processing.

In some embodiments, the systems and methods discussed herein can determine the presence or absence of an object in a freight item and detect physical damage, leaks, and tampering associated with an object or freight item. The described systems and methods can also determine the dimensions of freight items, detect the type of packaging information (e.g., expiration date or logo), and sense the temperature of an object or freight item. These systems and methods can further identify objects or freight items that don't have standard tags, bar codes, or other identifiers. Additionally, the described systems and methods can track the time it takes to load freight onto a truck, unload freight from a truck, and other shipping dock-related operations.

Figure 2:
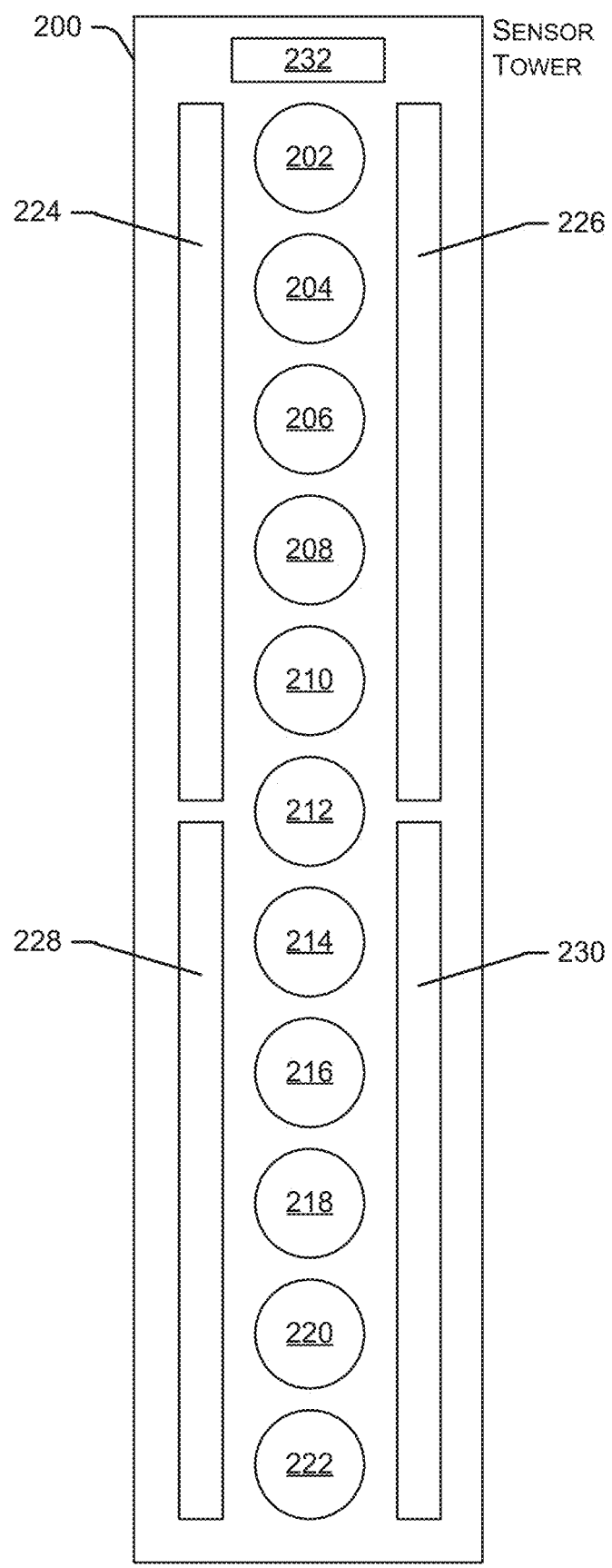
FIG. 2 illustrates an embodiment of a sensor tower that includes eleven cameras.

FIG. 2 illustrates an embodiment of a sensor tower 200 that includes eleven cameras numbered 202-222. Sensor tower 200 may include at least one housing that provides support for cameras 202-222 and other components associated with sensor tower 200, as discussed herein. The housing may have any shape, any number of pieces, and may be manufactured from any one or more materials. Sensor towers 104 and 106 may be similar or identical to sensor tower 200. In some embodiments, cameras 202-222 may be different types of cameras such as wide-angle cameras and high precision cameras. Cameras 202-222 may operate in the visible light spectrum or any other light spectrum. In some embodiments, cameras 202-222 may have different lenses based on the size (e.g., width) of the loading dock. In some embodiments, at least one camera 202-222 may be a monochrome sensor and at least one other camera 202-222 is a color camera. In other implementations, different cameras 202-222 may have different numbers of pixels or different pixel sizes. In specific embodiments, one or more of cameras 202-222 can be IR (infrared) cameras, 3D (three dimensional) time of flight cameras, thermal cameras, and the like.

In some embodiments, the size of loading dock 102 and the distance between the sensor towers and the distance between the towers and freight items may require different camera lenses with different focal distances (e.g., focal lengths). For example, smaller focal length lenses may be used in situations where the freight item passes closer to a sensor tower. When using larger focal length lenses, less information is captured close to the sensor tower, but the information farther away from the tower is more precise.

In a particular implementation, camera 206 is a wide angle camera and the remaining cameras (202, 204, and 208-222) are high precision cameras. In this implementation, the wide angle camera is positioned as camera 206 to provide sufficient height above the floor that allows the systems and methods described herein to better utilize the wide angle field of view. High precision cameras 202, 204, and 208-222 capture higher resolution images at different vertical points of view. The arrangement of high precision cameras 202, 204, and 208-222 provide overlapping fields of view as shown, for example, in FIG. 5.

In some embodiments, cameras 202-222 are aimed perpendicular to the vertical axis of sensor tower 200. In other embodiments, one or more of cameras 202-222 are aimed at different angles with respect to the vertical axis of sensor tower 200 to capture images from different angles and different perspectives.

In some embodiments, cameras 202-222 are synchronized such that all cameras 202-222 capture images at the same time. In particular implementations, this synchronization may be performed using a control system or a master camera that triggers all other cameras in sensor tower 200. In some embodiments, cameras 202-222 have fast shutter speeds (e.g., less than 100 microseconds).

Sensor tower 200 also includes four light bars 224, 226, 228, and 230 that illuminate the freight items passing through the loading dock. In some embodiments, light bars 224-230 may strobe at the same frequency that cameras 202-222 capture images. For example, the light bars may strobe at 24 Hz and cameras 202-222 may capture images at 24 Hz. Although four light bars 224-230 are shown in FIG. 2, alternate embodiments may include any number of light bars in sensor tower 200. Additionally, alternate embodiments may include lights that have any shape, such as multiple round lights, square lights, and other shapes or configurations. In some embodiments, light bars 224-230 are strobing three times faster than the cameras are capturing images. Thus, if the cameras are capturing images at 24 Hz, light bars 224-230 are strobing at 72 Hz. In some embodiments, the brightness of one or more light bars 224-230 is adjusted based on the ambient light level. For example, if the ambient light level is low, one or more light bars 224-230 may be adjusted to a brighter level to better illuminate the freight item. Similarly, if the ambient light level is high, one or more light bars 224-230 may be adjusted to a lower brightness level to avoid over-saturating the freight item with light. In some embodiments, the brightness of one or more light bars 224-340 is adjusted to optimize the detection and identification of labels, printing, markings, and the like associated with a freight item or objects associated with the freight item.

Sensor tower 200 further includes a status light 232. In some embodiments, status light 232 is red when sensor tower 200 is not in operation and green when sensor tower 200 is operating normally. Sensor tower 200 may not be operating, for example, when the loading dock door is closed or when the loading dock is blocked by an object. In alternate embodiments, any number of status lights 232 may be included in sensor tower 200. In these alternate embodiments, the status lights 232 may be arranged in any configuration. For example, if sensor tower 200 has four status lights 232, the four lights may indicate network status, processing status, motion status, and general system status.

In the example of FIG. 2, sensor tower 200 includes various cameras 200-222 as sensors. In other embodiments, sensor tower 200 may include additional types of sensors, such as radio-frequency identification (RFID) sensors, light detection and ranging (lidar) sensors, thermal sensors, time-of-flight (ToF) sensors, proximity sensors, weight sensors, ultrasonic sensors, IR sensors, and air purity sensors. In particular implementations, sensor tower 200 may include any number of different types of sensors to capture different types of information. The data from all types of sensors may be aggregated to provide enhanced analysis of a freight item and improved identification of one or more objects associated with the freight item.

In some embodiments, sensor tower 200 may include two sets of cameras 200-222 on opposite sides of sensor tower 200. For example, if two loading docks are close to one another, sensor tower 200 with two sets of cameras 200-222 may be positioned between the two loading docks. In some implementations a first set of cameras 200-222 may capture a first set of images (associated with a first loading dock) that are processed by a first computing system, and a second set of cameras 200-222 may capture a second set of images (associated with a second loading dock) that are processed by a second computing system. This arrangement allows a single sensor tower 200 to capture images of freight items on two adjacent loading docks.

Figure 3:
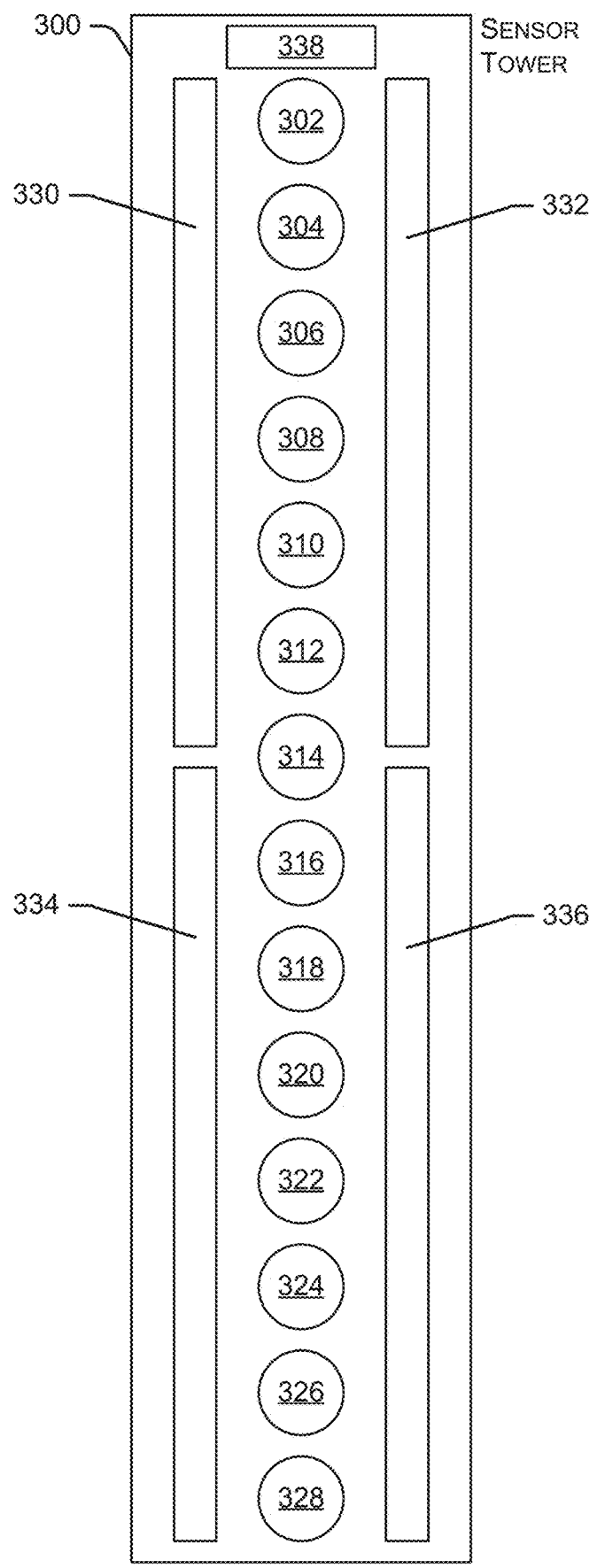
FIG. 3 illustrates an embodiment of a sensor tower that includes fourteen cameras.

FIG. 3 illustrates an embodiment of a sensor tower 300 that includes fourteen cameras numbered 302-328. Sensor tower 300 may include at least one housing that provides support for cameras 302-328 and other components associated with sensor tower 300, as discussed herein. The housing may have any shape, any number of pieces, and may be manufactured from any one or more materials. Sensor towers 104 and 106 may be similar or identical to sensor tower 300. In some embodiments, cameras 302-328 may be different types of cameras such as wide-angle cameras and high precision cameras. Cameras 302-328 may operate in the visible light spectrum or any other light spectrum. In some embodiments, cameras 302-328 may have different lenses based on the size (e.g., width) of the loading dock.

In a particular implementation, cameras 308 and 322 are wide angle cameras and the remaining cameras (302-306, 310-320, and 324-328) are high precision cameras. In this implementation, the wide angle cameras are positioned to maximize the field of view of wide angle cameras 308 and 322 at the working ranges of sensor tower 300. High precision cameras 302-306, 310-320, and 324-328 capture higher resolution images at different vertical points of view. The arrangement of high precision cameras 302-306, 310-320, and 324-328 provide overlapping fields of view as shown, for example, in FIG. 5.

In some embodiments, cameras 302-328 are synchronized such that all cameras 302-328 capture images at the same time. In particular implementations, this synchronization may be performed using a control system or a master camera that triggers all other cameras in sensor tower 300. In some embodiments, cameras 302-328 have fast shutter speeds (e.g., less than 100 microseconds).

Sensor tower 300 also includes four light bars 330, 332, 334, and 336 that illuminate the freight items passing through the loading dock. In some embodiments, light bars 330-336 may strobe at the same frequency that cameras 302-328 capture images. For example, the light bars may strobe at 24 Hz and cameras 302-328 may capture images at 24 Hz. Although four light bars 330-336 are shown in FIG. 3, alternate embodiments may include any number of light bars in sensor tower 300.

Sensor tower 300 further includes a status light 338. In some embodiments, status light 338 is red when sensor tower 300 is not in operation and green when sensor tower 300 is operating normally. Sensor tower 300 may not be operating, for example, when the loading dock door is closed or when the loading dock is blocked by an object.

In the example of FIG. 3, sensor tower 300 includes various cameras 302-328 as sensors. In other embodiments, sensor tower 300 may include additional types of sensors, such as radio-frequency identification (RFID) sensors, light detection and ranging (lidar) sensors, thermal sensors, time-of-flight (ToF) sensors, proximity sensors, weight sensors, and air purity sensors. In particular implementations, sensor tower 300 may include any number of different types of sensors to capture different types of information. The data from all types of sensors may be aggregated to provide enhanced analysis of a freight item and improved identification of one or more objects associated with the freight item.

Figure 4:
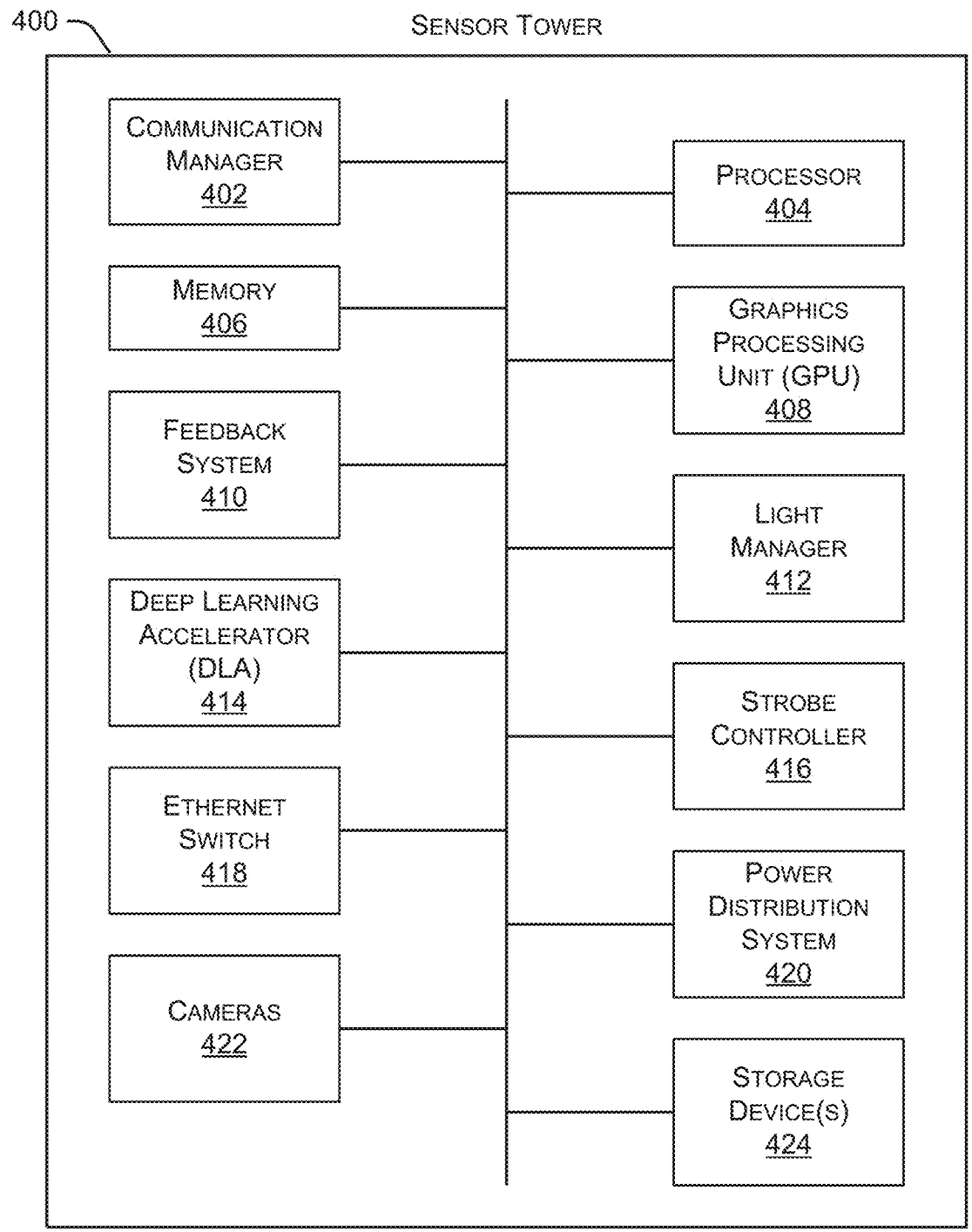
FIG. 4 is a block diagram illustrating an embodiment of a sensor tower.

FIG. 4 is a block diagram illustrating an embodiment of a sensor tower 400. As shown in FIG. 4, sensor tower 400 includes a communication manager 402, a processor 404, and a memory 406. Communication manager 402 allows sensor tower 400 to communicate with other systems and components. Processor 404 executes various instructions to perform the functionality provided by sensor tower 400, as discussed herein. Memory 406 stores these instructions as well as other data used by processor 404 and other modules and components contained in sensor tower 400.

Sensor tower 400 may further include a graphics processing unit 408, a feedback system 410, and a light manager 412. Graphics processing unit 408 may process and manage various images captured by the cameras associated with sensor tower 400. Graphics processing unit 408 may also manage the analysis of the captured images and storage of the results of the analysis. In some embodiments, graphics processing unit 408 is optimized for processing images of the types captured by the sensor towers discussed herein. For example, graphics processing unit 408 may analyze captured images to identify regions of interest within the images and identify particular markings or other identifiers that can determine the contents of an object associated with a freight item. Feedback system 410 may provide feedback to users or systems located near sensor tower 400. In some embodiments, feedback system 410 provides feedback in the form of light signals, audio signals (e.g., via speakers), and the like. Light manager 412 may manage one or more light bars and one or more status lights associated with sensor tower 400. For example, light manager 412 may determine whether the light bars should be activated and determine a color (e.g., red or green) for the status light.

Additionally, sensor tower 400 may include a deep learning accelerator 414, a strobe controller 416, an ethernet switch 418, a power distribution system 420, cameras 422, and one or more storage devices 424. Deep learning accelerator 414 may execute various deep learning systems, such as neural networks. In some embodiments, deep learning accelerator 414 may identify one or more objects associated with a freight item based on the information detected in the captured images. Additional details regarding the identification of objects are discussed herein. Strobe controller 416 may control the frequency at which the light bars flash. As discussed herein, in some embodiments, the light bars flash at 24 Hz to match the frequency of the cameras. Ethernet switch 418 may provide switching between the sensor tower cameras and other systems or components. Power distribution system 420 may manage the distribution of power to various systems and components in sensor tower 400. Cameras 422 capture images of freight items moving through a loading dock, as discussed herein. One or more storage devices 424 are capable of storing various types of information, such as captured images, identified freight items, identified objects associated with freight items, and the like. Storage devices 424 include, for example, solid state drives, memory devices, and the like.

Figure 5:
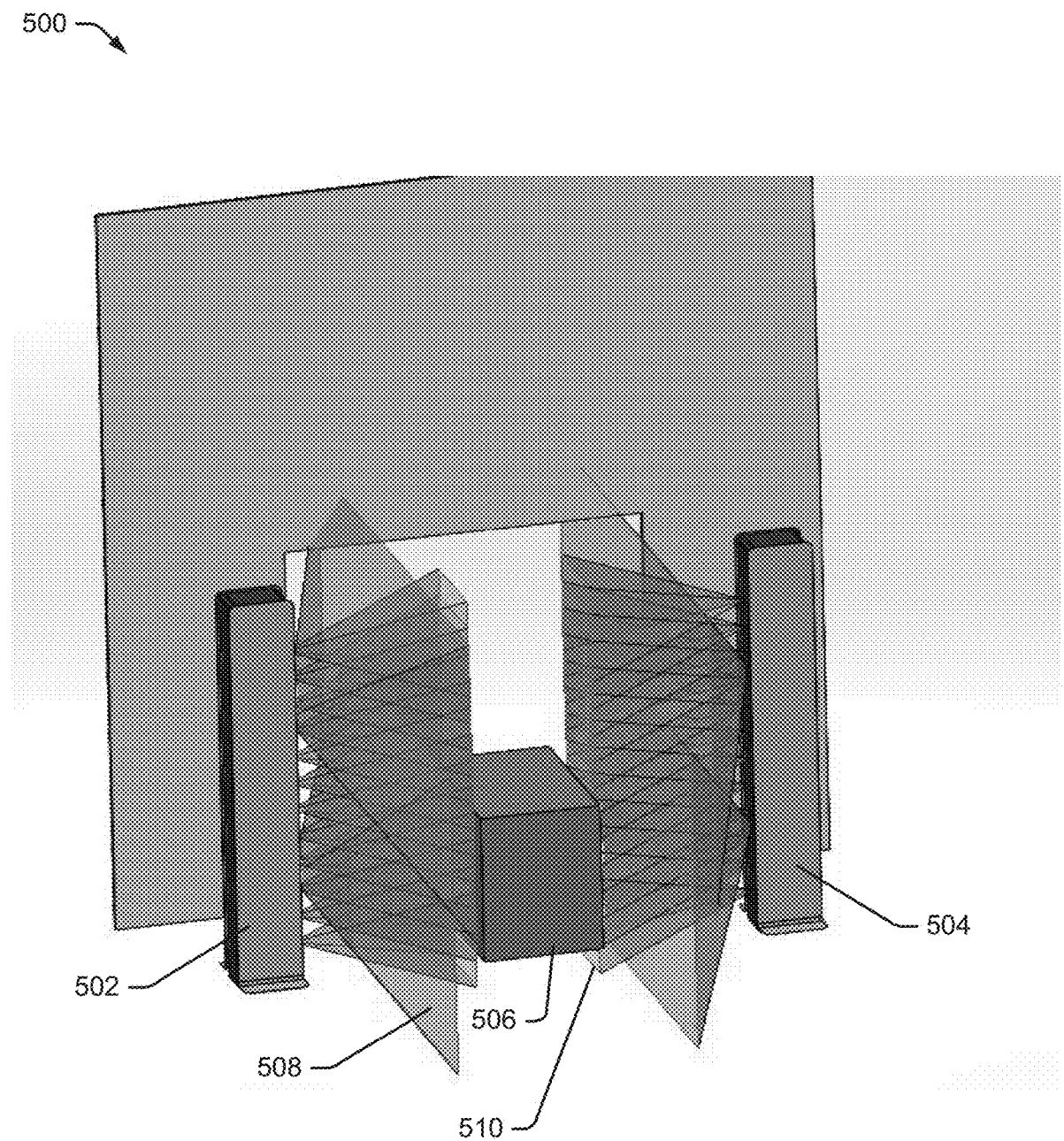
FIG. 5 illustrates an embodiment of a freight item moving across a loading dock between two sensor towers.

FIG. 5 illustrates an embodiment 500 of a freight item moving across a loading dock between two sensor towers. As shown in FIG. 5, sensor towers 502 and 504 are located on opposite sides of a loading dock. A freight item 506 is moving across the loading dock. As discussed herein, sensor towers 502 and 504 each have multiple cameras that scan freight item 506 as it passes through the loading dock. As shown in FIG. 5, the wide angle cameras have a larger field of view 508. In contrast, the high precision cameras have a narrower field of view 510. The multiple fields of view 508 and 510 overlap one another as illustrated in FIG. 5.

Figure 6:
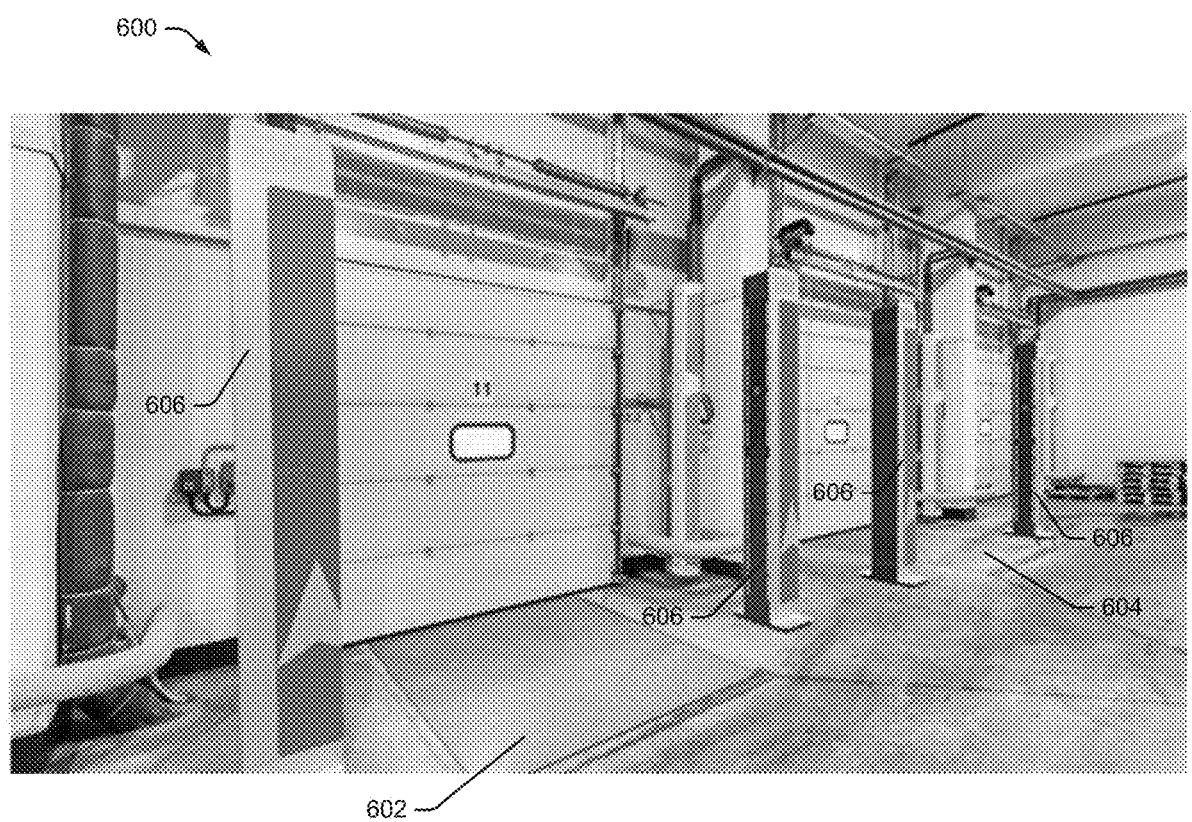
FIG. 6 illustrates an embodiment of multiple loading docks where each loading dock has two sensor towers positioned at opposite sides of the loading dock.

FIG. 6 illustrates an embodiment 600 of multiple loading docks where each loading dock has two sensor towers 606 positioned at opposite sides of the loading dock. As shown in FIG. 6, a first loading dock 602 includes a pair of sensor towers 606 and a second loading dock 604 has another pair of sensor towers 606. Although the example of FIG. 6 illustrates two loading docks 602 and 604, any number of pairs of sensor towers 606 may be used with any number of loading docks. In some embodiments, a single sensor tower 606 may be used with each loading dock instead of a pair of sensor towers.

Figure 7:
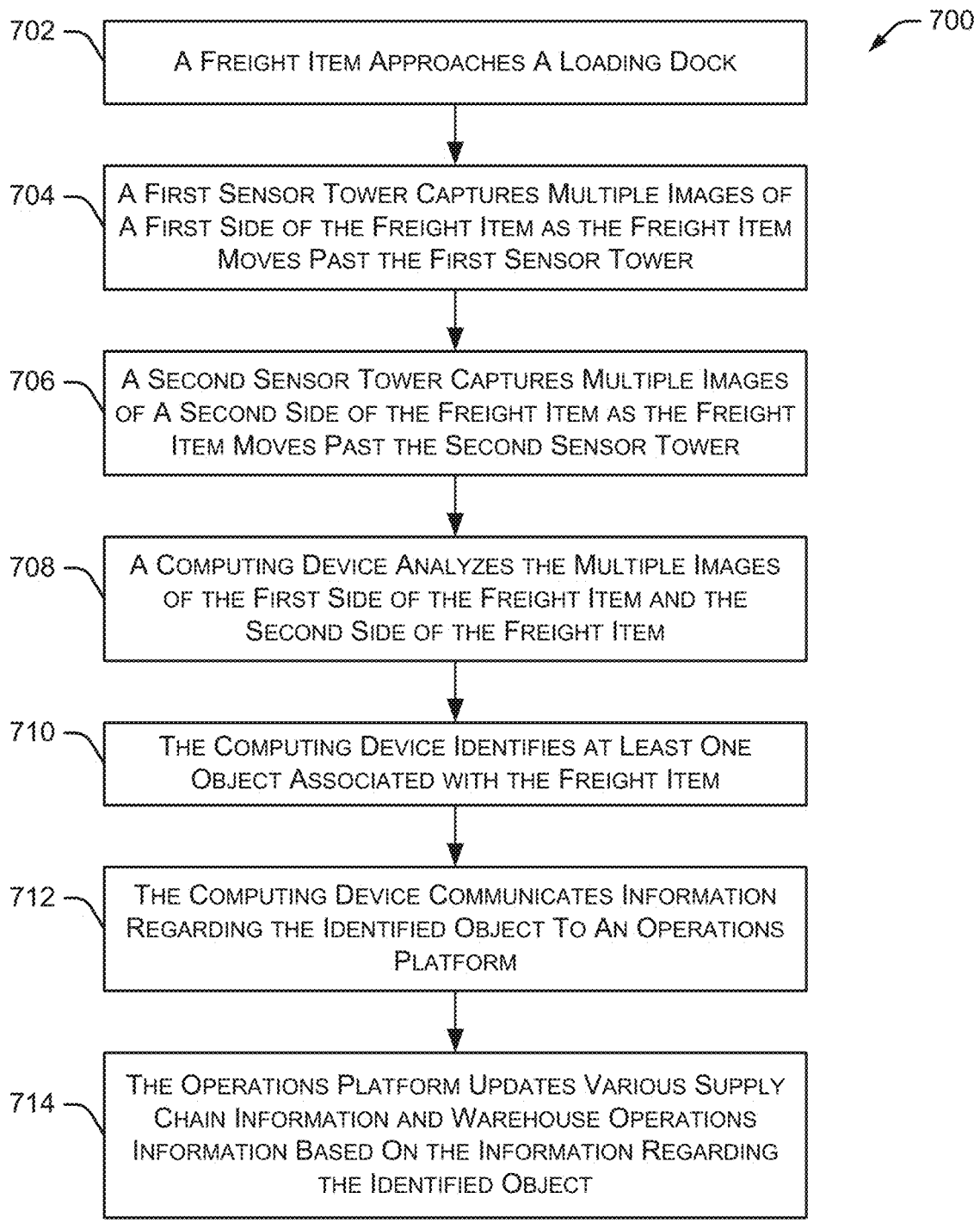
FIG. 7 is a flow diagram illustrating an embodiment of a process for scanning a freight item, using two sensor towers, as it moves across a loading dock.

FIG. 7 is a flow diagram illustrating an embodiment of a process 700 for scanning a freight item, using two sensor towers, as it moves across a loading dock. Initially, a freight item approaches 702 a loading dock. A first sensor tower captures 704 multiple images of a first side of the freight item as the freight item moves past the first sensor tower. A second sensor tower captures 706 multiple images of a second side of the freight item as the freight item moves past the second sensor tower.

Process 700 continues as a computing device analyzes 708 the multiple images of the first side of the freight item and the second side of the freight item. The computing device then identifies 710 at least one object associated with the freight item. For example, the object may be an item on a pallet, an item in a container, and the like. In some embodiments, objects can be identified from the captured images based on a variety of attributes. For example, the captured images may include product labels, bar codes, company logos, product logos, part numbers, product numbers, expiration dates, batch numbers, and other markings that identify an object and may associate the object with a particular manufacturer.

In some embodiments, some objects associated with a freight item are not labeled and do not have any other distinguishing markings. In these situations, the systems and methods described herein may determine the dimensions of the object and other characteristics. For example, if the object is in a box, the systems and methods may determine the dimensions of the box, the color of the box, the reflectivity of the box, the texture of the box, the material used to make the box, and the like. In some embodiments, an object may further be identified based on the object's temperature.

In some embodiments, the described systems and methods may also identify any damage to an object, evidence of tampering with the object, or evidence of leakage of the object's contents.

Referring again to process 700, the computing device further communicates 712 information regarding the identified object to an operations platform. Process 700 continues as the operations platform updates 714 various supply chain information and warehouse operations information based on the information regarding the identified object.

Figure 8:
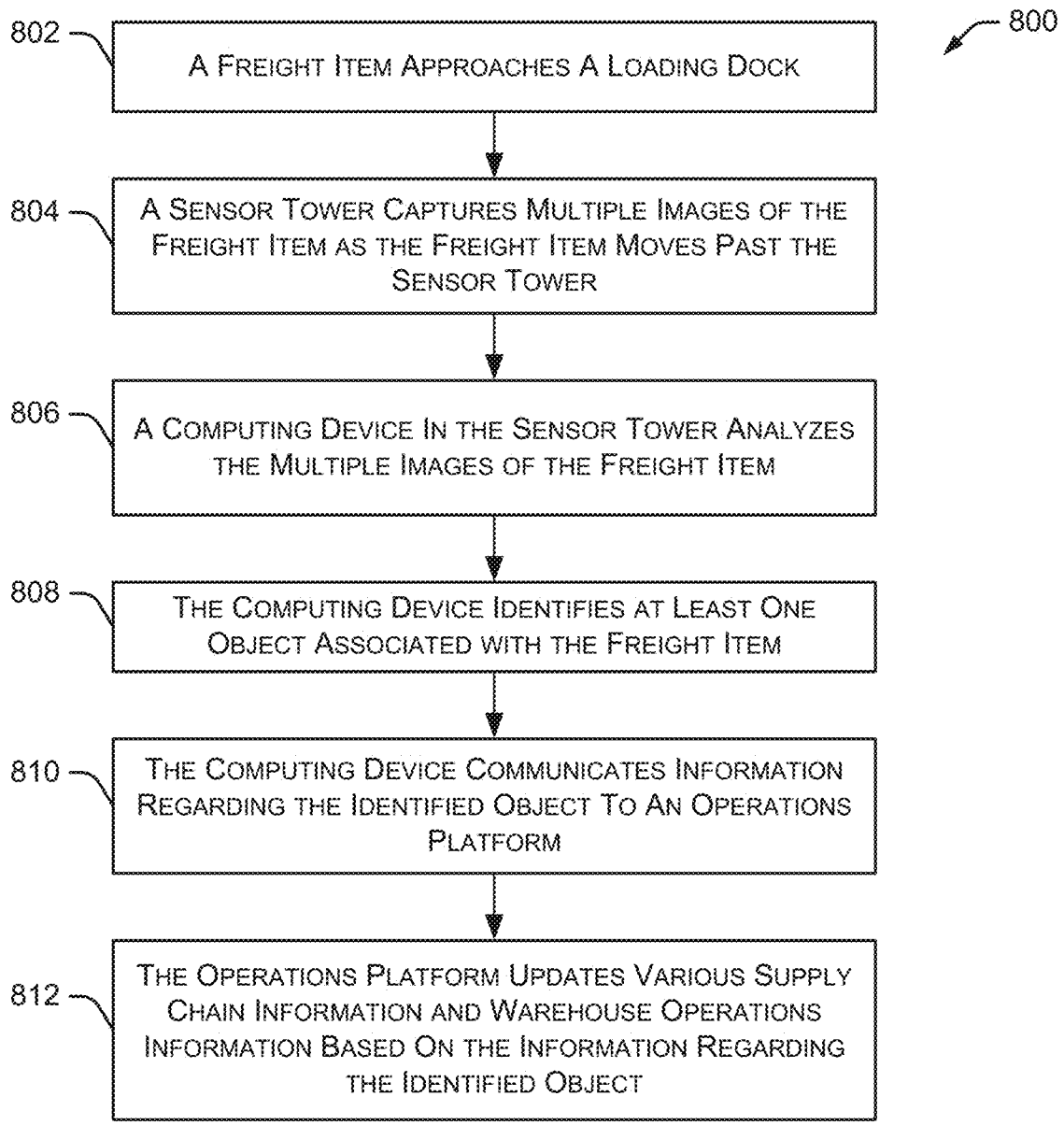
FIG. 8 is a flow diagram illustrating an embodiment of a process for scanning a freight item, using one sensor tower, as it moves across a loading dock.

FIG. 8 is a flow diagram illustrating an embodiment of a process 800 for scanning a freight item, using one sensor tower, as it moves across a loading dock. Initially, a freight item approaches 802 a loading dock. A sensor tower captures 804 multiple images of the freight item as the freight item moves past the sensor tower. Process 800 continues as a computing device in the sensor tower analyzes 806 the multiple images of the freight item. The computing device then identifies 808 at least one object associated with the freight item. As noted above, the object may be an item on a pallet, an item in a container, and the like. Process 800 continues as the computing device communicates 810 information regarding the identified object to an operations platform. The operations platform updates 812 various supply chain information and warehouse operations information based on the information regarding the identified object.

FIG. 9 illustrates an embodiment of a freight record 900 for a particular freight item that was scanned using the systems and methods discussed herein. Example freight record 900 includes information related to a particular pallet of objects delivered from a truck to a loading dock. The information includes, for example, a truck ID, time of delivery, pallet information, number of boxes, and the like. Other embodiments of freight record 900 may contain additional information not shown in FIG. 9. In particular implementations, a freight record may include where items are coming from or going to (e.g., addresses), logistics company information, a shipping company identifier, pallet weight, special information regarding the contents of a pallet (e.g., do not stack more than three pallets or temperature restrictions), and the like.

Figure 10:
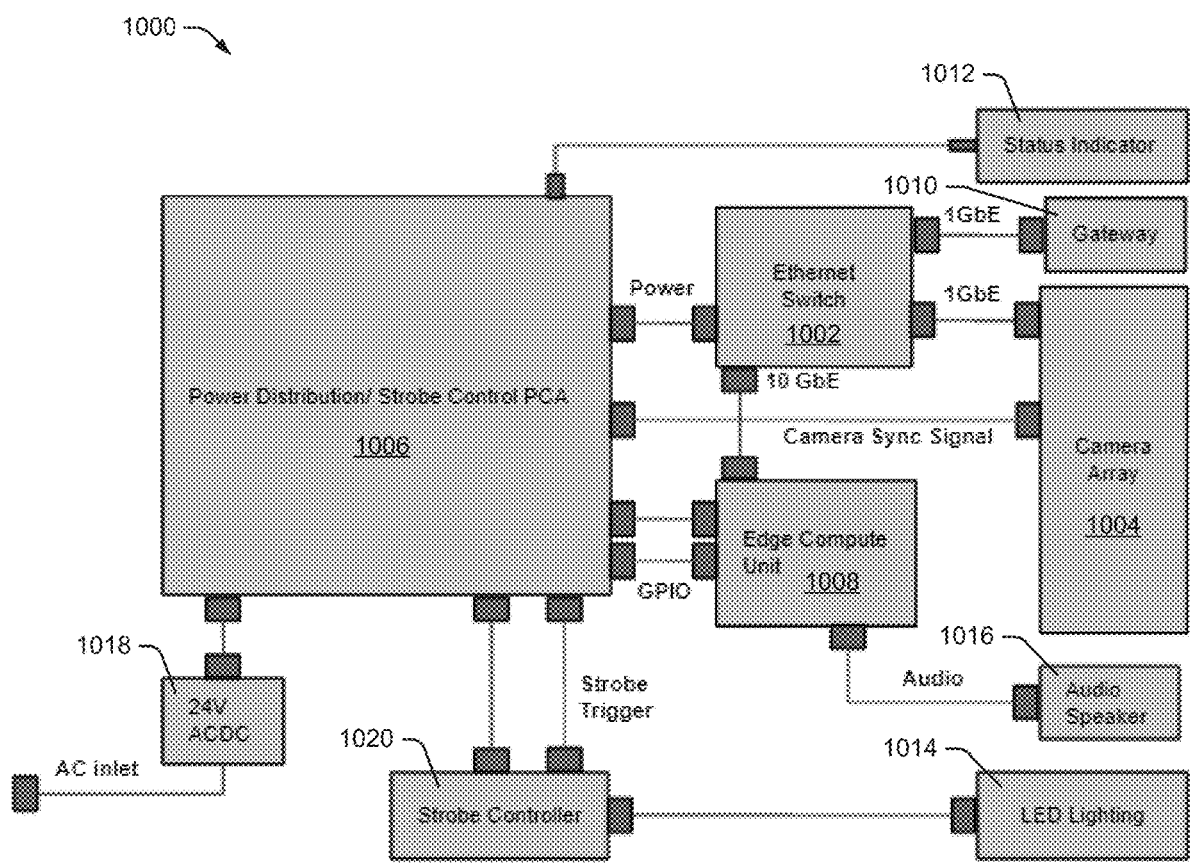
FIG. 10 is a schematic diagram of an embodiment of a sensor tower.

FIG. 10 is a schematic diagram 1000 of an embodiment of a sensor tower. In the example of FIG. 10, the sensor tower includes many components and systems discussed herein. For example, schematic diagram 1000 illustrates an ethernet switch 1002 connected to a camera array 1004, a power distribution panel 1006, and a computing system (e.g., an edge compute unit) 1008. Schematic diagram also illustrates a gateway 1010 and status indicator (e.g., LEDs) 1012. In some embodiments gateway 1010 is connected to ethernet switch 1002 and power distribution panel 1006. Gateway 1010 may contain wireless communication modules, such as LTE (Long-Term Evolution), WiFi, BLE (Bluetooth Low Energy), and GPS (Global Positioning System). Gateway 1010 may also include any number of antennas associated with the wireless communication modules. One or more of the wireless communication modules may transmit data from the sensor tower to other systems, such as cloud-based computing devices.

FIG. 10 further illustrates LED lighting 1014 and an audio speaker 1016. Power distribution panel 1006 is also connected to a 24V ACDC converter 1018 and a strobe controller 1020. 24V ACDC converter 1018 transforms AC power into DC power at 24V. The 24V power rail is then connected to power distribution panel 1006 and other systems and components that are powered by 24V. Although some of the systems and methods described herein use 24V, alternate embodiments may use a different voltage. Additionally, some embodiments of a sensor tower may use two or more voltages, such as 5V, 12V, 24V, 48V, and the like. Strobe controller 1020 manages the strobe frequency of various lights associated with the sensor tower. The various components and systems shown in FIG. 10 are similar to the components and systems discussed herein.

Figure 11:
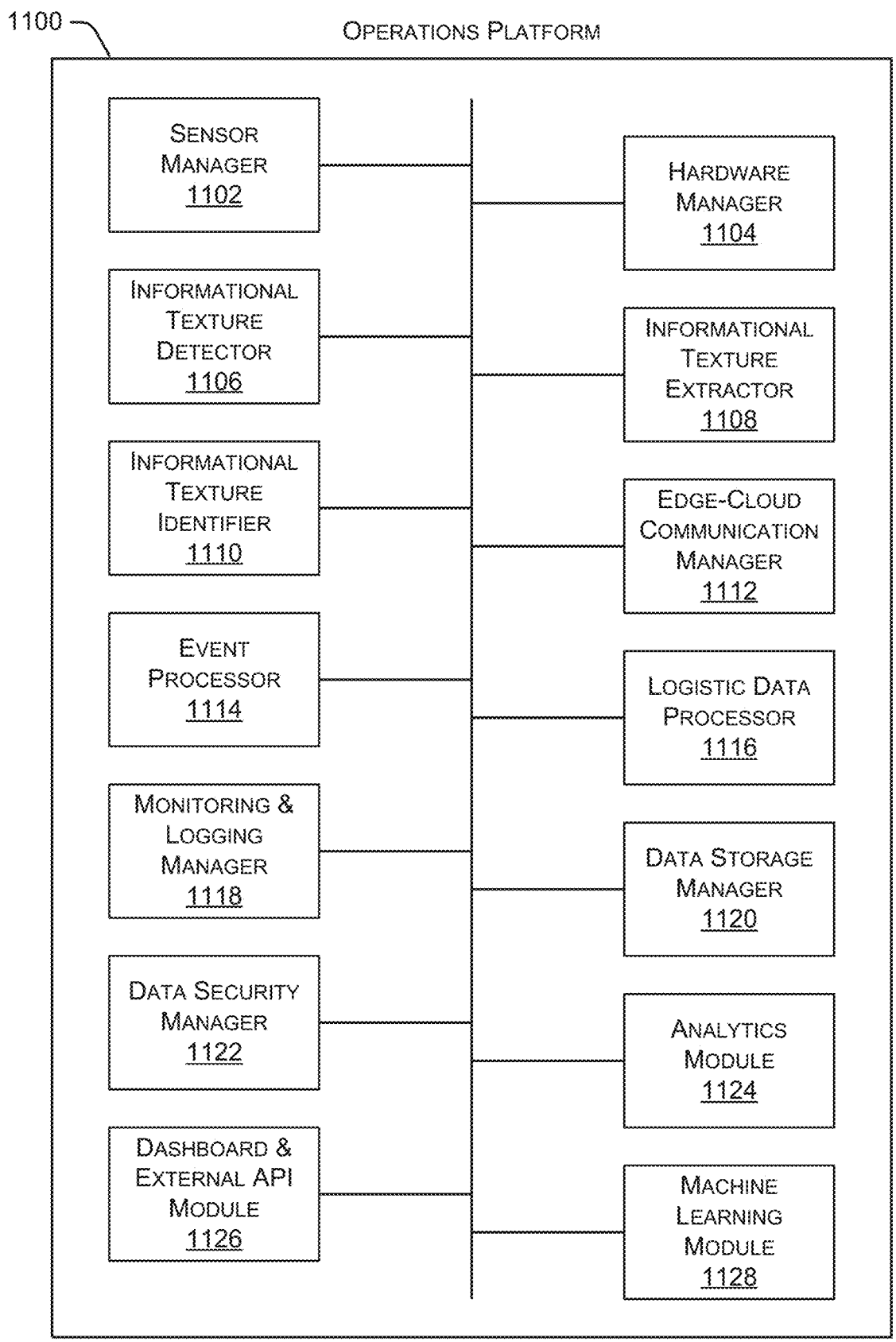
FIG. 11 is a block diagram illustrating an embodiment of an operations platform.

FIG. 11 is a block diagram illustrating an embodiment of operations platform 1100. In some embodiments, operations platform 1100 is similar to operations platform 120 illustrated in FIG. 1. As shown in FIG. 11, operations platform 1100 includes a sensor manager 1102 that manages various sensors (e.g., cameras and other sensors) in one or more sensor towers. A hardware manager 1104 manages various features, such as feedback lights, thermal controls, and the like. For example, hardware manager 1104 may activate one status light for two seconds in response to detecting and scanning a freight item. Operations platform 1100 also includes an information texture detector 1106 that detects various textures associated with a freight item or particular objects associated with a freight item. An informational texture extractor 1108 is capable of extracting informational texture information from the detected informational texture data captured by information texture detector 1106. An informational texture identifier 1110 identifies particular freight items or objects associated with a freight item based on the detected and extracted informational texture data.

Operations platform 1100 further includes an edge-cloud communication manager 1112 that communicates with one or more cloud-based systems. For example edge-cloud communication manager may send identified data to the cloud, send telemetry data to the cloud, receive operational commands from the cloud, and the like. An event processor 1114 is capable of processing a variety of events, such as a truck arrival, a truck departure, freight loading events, freight unloading events, freight identification, object identification, and the like. A logistic data processor 1116 is capable of processing various types of logistic data, such as processing high-level logistics data to infer information from previous steps (e.g., truck inventories, truck loading time, truck unloading time, and dock throughput).

Additionally, operations platform 1100 includes a monitoring and logging manager 1118 that is capable of monitoring and logging data associated with the software and hardware operating status. For example, monitoring and logging manager 1118 may log an operating status associated with a CPU load being too high, a temperature being too high, whether there is sufficient memory or disk storage space, and the like. A data storage manager 1120 handles the storage and retrieval of data generated by or used by any of the systems and components discussed herein. A data security manager 1122 is capable of securing various types of data received and generated by the systems and components described herein. In some examples, data security manager 1122 can handle data encryption, data deleted when an intrusion is detected, and the like.

Operations platform 1100 also includes an analytics module 1124 that performs various types of analysis to generate business insights and other data associated with the operation of the systems and methods described herein. A dashboard and external application programming interface (API) module 1126. For example, the dashboard may display various information associated with the movement of freight items, movement of trucks, scheduling of freight item shipments, time delays, time to load or unload a truck or other vehicle, and the like. A machine learning module 1128 manages and performs various machine learning operations that may, for example, assist with identifying freight items, objects associated with freight items, and the like.

Figure 12:
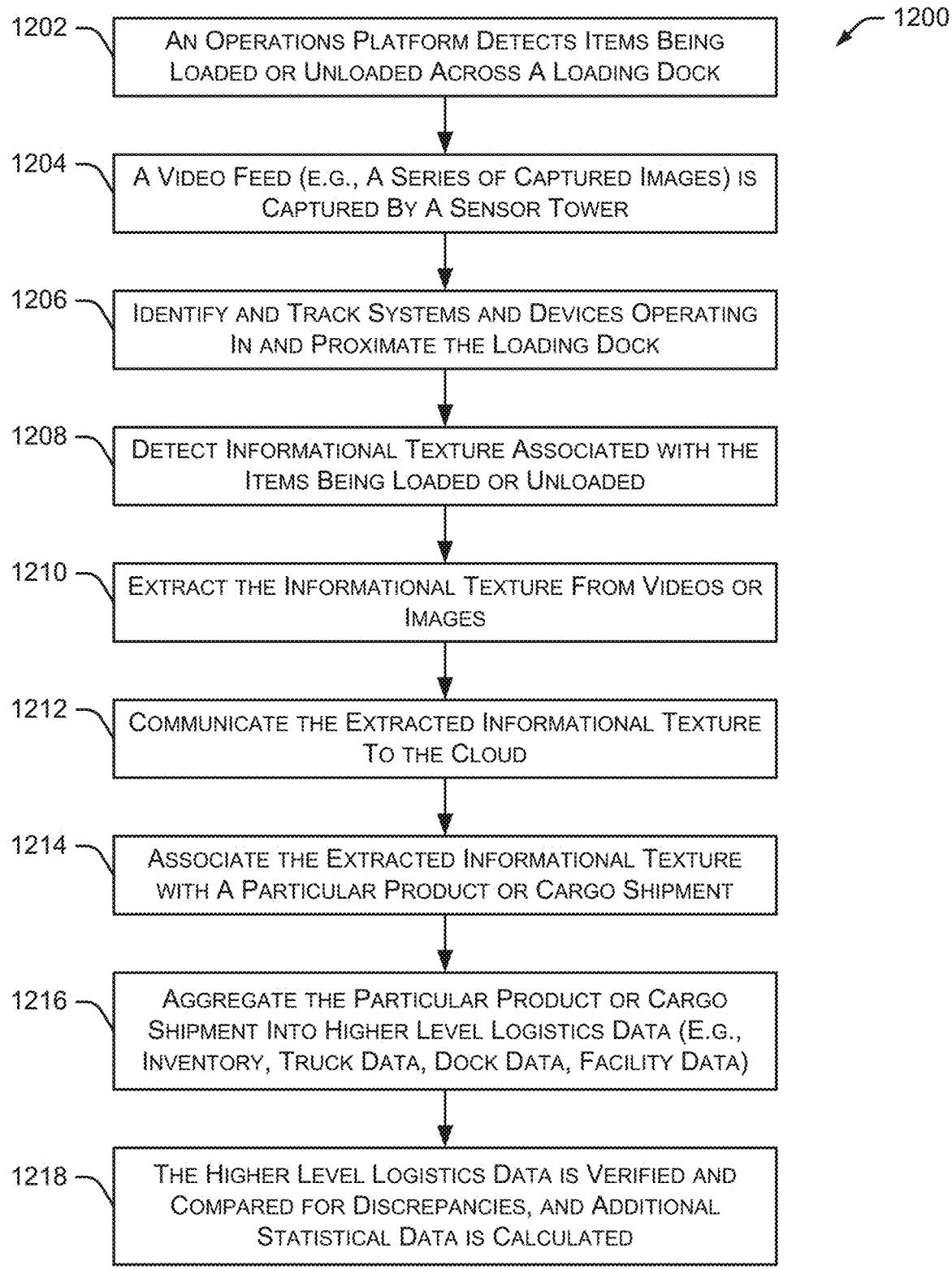
FIG. 12 is a flow diagram illustrating an embodiment of a process for managing operations associated with the operations platform.

FIG. 12 is a flow diagram illustrating an embodiment of a process 1200 for managing operations associated with the operations platform. Initially, an operations platform (e.g., operations platform 120 or 1100) detects 1202 one or more items (e.g., freight items) being loaded or unloaded across a loading dock. In some embodiments, the one or more items are moving proximate one or more sensors, such as sensors contained in one or more sensor towers. A video feed (e.g., a series of captured images) is captured 1204 by a sensor tower.

Process 1200 continues by identifying and tracking 1206 systems and devices that are operating in and proximate the loading dock. In some embodiments, the systems and devices may include fork lifts, trucks, pallets, workers with wearable devices, individual objects associated with a freight item, robotic devices, and the like. Process 1200 further detects 1208 informational texture associated with the items being loaded or unloaded. In some embodiments, the informational texture may include logos, labels, and other graphical markings or graphical information of the types discussed herein. Process 1200 continues by extracting 1210 the informational texture from videos or images.

In some embodiments, process 1200 may communicate 1212 the extracted informational texture data to the cloud. This is optional and, in some embodiments, the informational texture data is stored locally (e.g., within a warehouse or other local facility). The extracted informational texture is then associated 1214 with a particular product or cargo shipment. For example, the system may associate the extracted informational texture with a specific product or cargo shipment based on the informational texture identifier's identification of the texture with known products or cargo.

Process 1200 continues by aggregating 1216 the particular product or cargo shipment into higher level logistics data, such as inventory data, truck data, dock data, facility data, and the like. The higher level logistics data is then verified 1218 and compared for discrepancies, and additional statistical data is calculated. For example, the additional statistical data may include truck inventories, truck loading time, truck unloading time, dock throughput, and the like.

Figure 13:
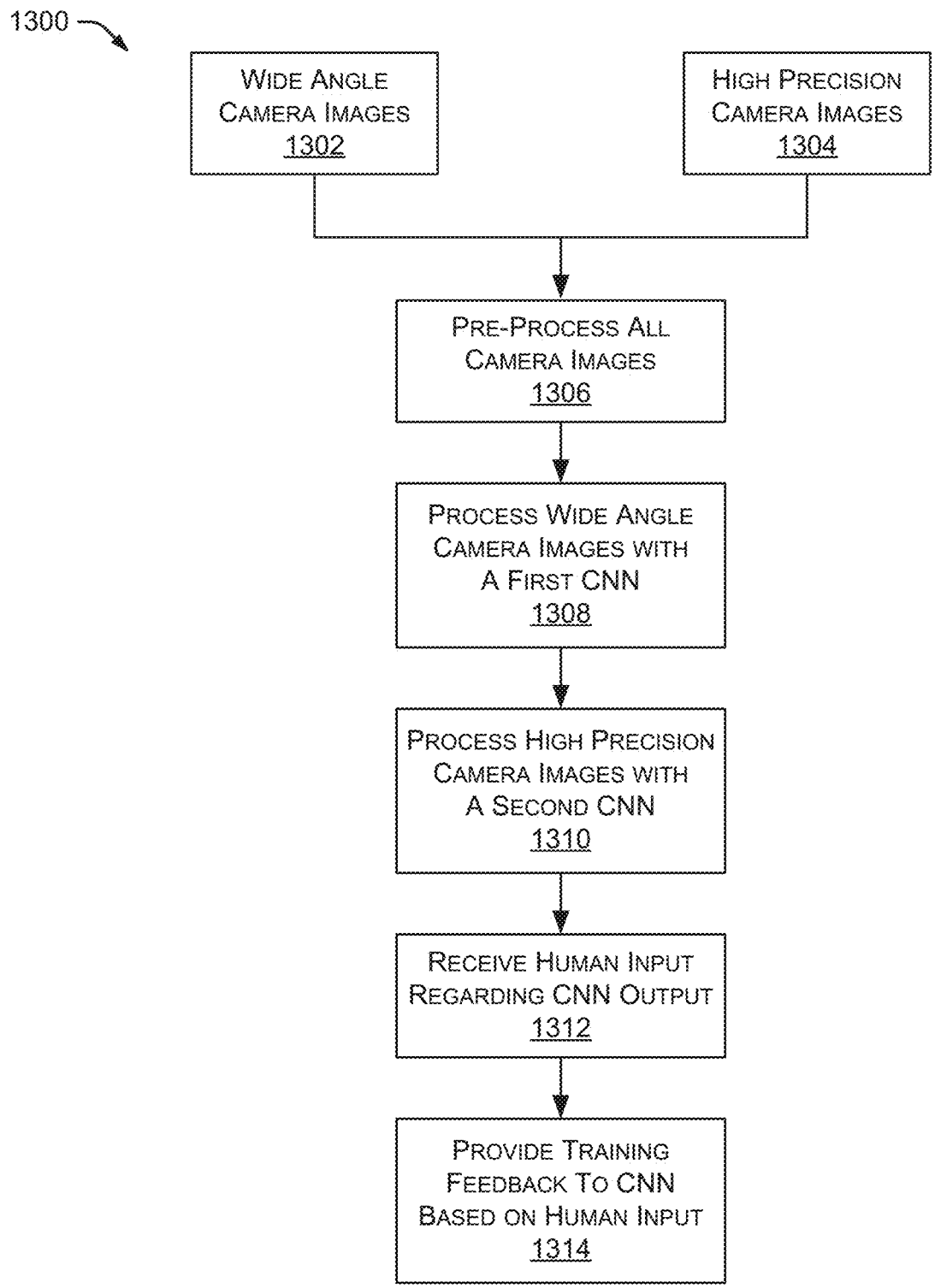
FIG. 13 is a flow diagram illustrating an embodiment of a process for processing image data using a convolutional neural network (CNN).

FIG. 13 is a flow diagram illustrating an embodiment of a process 1300 for processing image data using a convolutional neural network (CNN). Initially, process 1300 receives or captures wide angle camera images 1302 and high precision camera images 1304. As discussed herein, wide angle camera images 1302 and high precision camera images 1304 may be received from (or captured by) any number of cameras in one or more sensor towers. Process 1300 continues by pre-processing 1306 all camera images (e.g., all wide angle camera images 1302 and all high precision camera images 1304). Example pre-processing operations may include scaling images, transforming images, and other image processing operations to change the original captured image to the format and content that a CNN expects as input.

As shown in FIG. 13, process 1300 may process 1308 the wide angle camera images with a first CNN and process 1310 the high precision camera images with a second CNN. In some embodiments, the described systems and methods may use any number of CNNs to process image data and other types of data. In particular implementations, wide angle camera images are processes to understand the overall scene (e.g., overall loading dock information). The high precision camera images may be processed to identify informational texture, extract informational texture, and the like. In some embodiments, processing 1308 the wide angle camera images detect objects such as fork lifts, trucks, pallets, freight items, and other items in the loading dock. Processing 1310 of the high precision camera images may detect or identify small object textures (e.g., logos, text, and labels) and other specific information.

Process 1300 continues by receiving 1312 human input regarding the CNN output. In some embodiments, the human input may validate the detection or identification of data by a CNN. In other embodiments, the human input may correct the detection or identification of data by a CNN. Process 1300 may further provide 1314 training feedback to the CNN based on the human input. This training feedback may improve the future detection or identification of data by the CNN as it learns from the human validation or correction.

Figure 14:
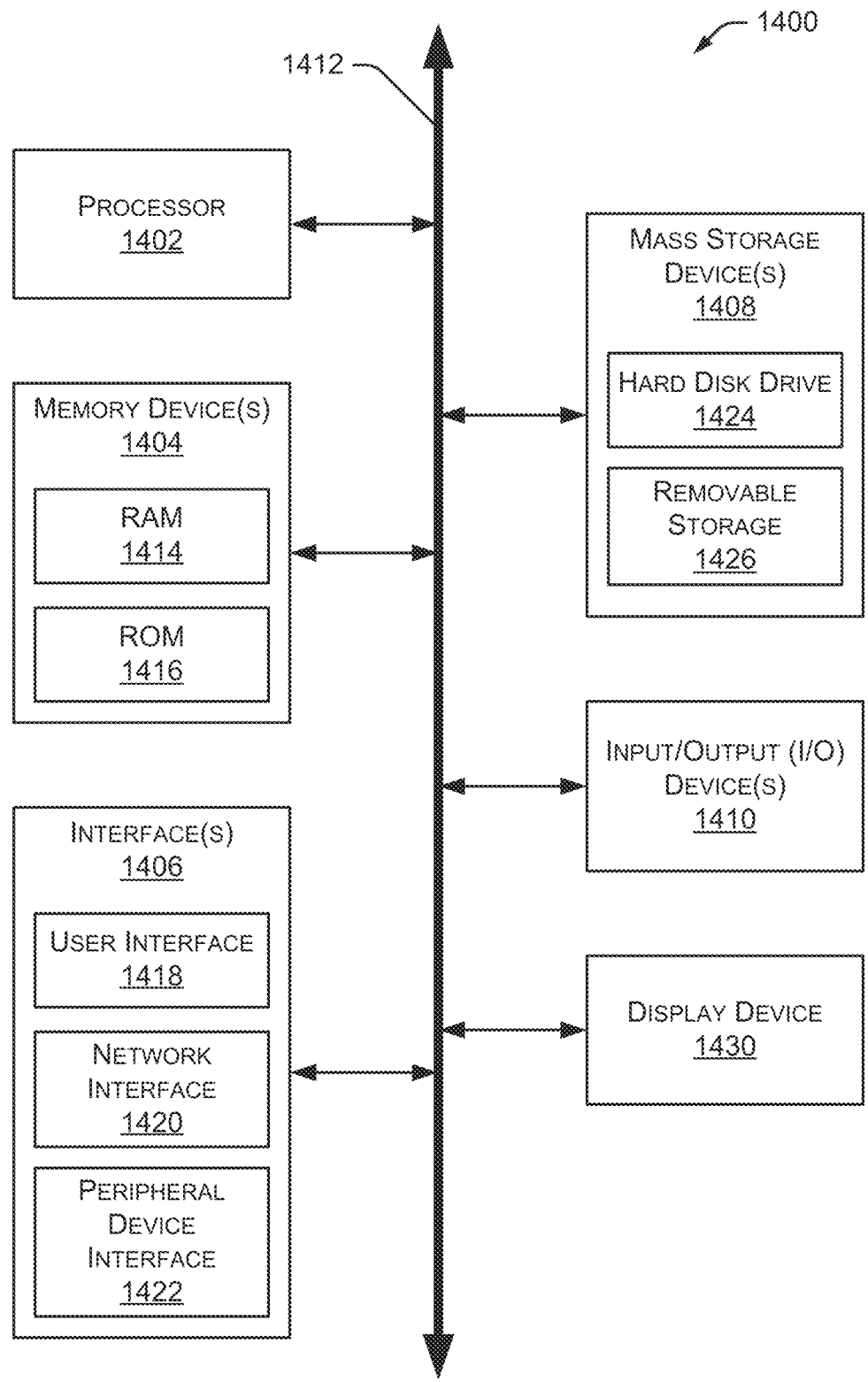
FIG. 14 illustrates an example block diagram of a computing device.

FIG. 14 illustrates an example block diagram of a computing device 1400 suitable for implementing the systems and methods described herein. In some embodiments, a cluster of computing devices interconnected by a network may be used to implement any one or more components of the systems discussed herein.

Computing device 1400 may be used to perform various procedures, such as those discussed herein. Computing device 1400 can function as a server, a client, or any other computing entity. Computing device can perform various functions as discussed herein, and can execute one or more application programs, such as the application programs described herein. Computing device 1400 can be any of a wide variety of computing devices, such as a desktop computer, a notebook computer, a server computer, a handheld computer, tablet computer and the like.

Computing device 1400 includes one or more processor(s) 1402, one or more memory device(s) 1404, one or more interface(s) 1406, one or more mass storage device(s) 1408, one or more Input/Output (I/O) device(s) 1410, and a display device 1430 all of which are coupled to a bus 1412. Processor(s) 1402 include one or more processors or controllers that execute instructions stored in memory device(s) 1404 and/or mass storage device(s) 1408. Processor(s) 1402 may also include various types of computer-readable media, such as cache memory.

Memory device(s) 1404 include various computer-readable media, such as volatile memory (e.g., random access memory (RAM) 1414) and/or nonvolatile memory (e.g., read-only memory (ROM) 1416). Memory device(s) 1404 may also include rewritable ROM, such as Flash memory.

Mass storage device(s) 1408 include various computer readable media, such as magnetic tapes, magnetic disks, optical disks, solid-state memory (e.g., Flash memory), and so forth. As shown in FIG. 14, a particular mass storage device is a hard disk drive 1424. Various drives may also be included in mass storage device(s) 1408 to enable reading from and/or writing to the various computer readable media. Mass storage device(s) 1408 include removable media 1426 and/or non-removable media.

I/O device(s) 1410 include various devices that allow data and/or other information to be input to or retrieved from computing device 1400. Example I/O device(s) 1410 include cursor control devices, keyboards, keypads, microphones, monitors or other display devices, speakers, printers, network interface cards, modems, lenses, CCDs or other image capture devices, and the like.

Display device 1430 includes any type of device capable of displaying information to one or more users of computing device 1400. Examples of display device 1430 include a monitor, display terminal, video projection device, and the like.

Interface(s) 1406 include various interfaces that allow computing device 1400 to interact with other systems, devices, or computing environments. Example interface(s) 1406 include any number of different network interfaces 1420, such as interfaces to local area networks (LANs), wide area networks (WANs), wireless networks, and the Internet. Other interface(s) include user interface 1418 and peripheral device interface 1422. The interface(s) 1406 may also include one or more user interface elements 1418. The interface(s) 1406 may also include one or more peripheral interfaces such as interfaces for printers, pointing devices (mice, track pad, etc.), keyboards, and the like.

Bus 1412 allows processor(s) 1402, memory device(s) 1404, interface(s) 1406, mass storage device(s) 1408, and I/O device(s) 1410 to communicate with one another, as well as other devices or components coupled to bus 1412. Bus 1412 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1400, and are executed by processor(s) 1402. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. An apparatus comprising:
a first sensor tower located proximate a loading dock, wherein the first sensor tower comprises a first plurality of camera sensors that capture a first set of images of a first side of a freight item as the freight item moves across the loading dock;
a second sensor tower located proximate the loading dock, wherein the second sensor tower comprises a second plurality of camera sensors that capture a second set of images of a second side of the freight item as the freight item moves across the loading dock, wherein the first and second sides of the freight item are distinct from one another; and
a computing device, communicatively coupled to the first sensor tower and the second sensor tower, configured to:
receive the first set of images of the first side of the freight item;
receive the second set of images of the second side of the freight item; and
analyze the first set of images and the second set of images to identify at least one object associated with the freight item.

2. The apparatus of claim 1, wherein the freight item comprises a shipping container carrying a plurality of objects.

3. The apparatus of claim 1, wherein the first sensor tower and the second sensor tower are located on opposite sides of the loading dock.

4. The apparatus of claim 1, wherein analyzing the first set of images and the second set of images to identify at least one object associated with the freight item comprises at least one of analyzing labels on the freight item, analyzing text on the freight item, analyzing logos on the freight item, analyzing a size of the freight item, analyzing a color of the freight item, and analyzing dimensions of the freight item.

5. The apparatus of claim 1, wherein analyzing the first set of images and the second set of images to identify at least one object associated with the freight item comprises at least one of analyzing objects associated with the freight item for damage and analyzing objects associated with the freight item for tampering.

6. The apparatus of claim 1, further comprising a communication device, communicatively coupled to the computing device, configured to communicate information associated with the identified object to an operations platform, wherein the operations platform is configured to update at least one of supply chain information or warehouse information.

7. The apparatus of claim 1, wherein the first sensor tower and the second sensor tower each comprise a plurality of lights to illuminate the freight item as it moves across the loading dock.

8. The apparatus of claim 1, wherein the first side of the freight item is opposite the second side of the freight item.

9. The apparatus of claim 1, wherein the first sensor tower further comprises at least one additional sensor comprising at least one of a radio-frequency identification (RFID) sensor, a light detection and ranging (lidar) sensor, a thermal sensor, a time-of-flight (ToF) sensor, and a proximity sensor.

10. The apparatus of claim 1, wherein:
the first sensor tower further comprises a second computing device, configured to analyze the first set of images; and
the second sensor tower further comprises a third computing device, configured to analyze the second set of images.

11. The apparatus of claim 1, wherein the first and second sides of the freight item do not overlap one another.

12. An apparatus comprising:
a first tower housing configured to support a first plurality of camera sensors that capture a first plurality of images of a first side of a freight item as the freight item moves across a loading dock;
a second tower housing configured to support a second plurality of camera sensors that capture a second plurality of images of a second side of the freight item as the freight item moves across the loading dock, wherein the first and second sides of the freight item are distinct from one another; and
a computing device, communicatively coupled to the first plurality of camera sensors and the second plurality of camera sensors, configured to:
receive the first plurality of images of the first side of the freight item;
receive the second plurality of images of the second side of the freight item; and
analyze the first plurality of images and the second plurality of images to identify at least one object associated with the freight item.

13. The apparatus of claim 12, wherein the freight item comprises a shipping container carrying a plurality of objects.

14. The apparatus of claim 12, wherein analyzing the first plurality of images and the second plurality of images to identify at least one object associated with the freight item comprises at least one of analyzing labels on the freight item, analyzing text on the freight item, analyzing logos on the freight item, analyzing a size of the freight item, analyzing a color of the freight item, and analyzing dimensions of the freight item.

15. The apparatus of claim 12, wherein analyzing the first plurality of images and the second plurality of images comprises at least one of analyzing objects associated with the freight item for damage and analyzing objects associated with the freight item for tampering.

16. The apparatus of claim 12, further comprising at least one additional sensor, communicatively coupled to the computing device, wherein the at least one additional sensor comprises at least one of a radio-frequency identification (RFID) sensor, a light detection and ranging (lidar) sensor, a thermal sensor, a time-of-flight (ToF) sensor, and a proximity sensor.

17. The apparatus of claim 12, wherein each tower housing is positioned proximate a side of the loading dock.

18. The apparatus of claim 12, wherein the first and second sides of the freight item do not overlap one another.

19. A method comprising:
capturing, by a first plurality of camera sensors in a first sensor tower located proximate a loading dock, a first set of images of a first side of a freight item as the freight item moves across the loading dock;

capturing, by a second plurality of camera sensors in a second sensor tower located proximate the loading dock, a second set of images of a second side of the freight item as the freight item moves across the loading dock, wherein the first and second sides of the freight item are distinct from one another; and analyzing, by a computing device, the first set of images and the second set of images to identify at least one object associated with the freight item.

20. The method of claim 19, wherein the first sensor tower is located proximate a first side of the loading dock, wherein the second sensor tower is located proximate a second side of the loading dock, and wherein the first side and the second side are opposite one another.

21. The method of claim 19, wherein analyzing the first set of images and the second set of images to identify at least one object associated with the freight item comprises at least one of analyzing labels on the freight item, analyzing text on the freight item, analyzing logos on the freight item, analyzing a size of the freight item, analyzing a color of the freight item, and analyzing dimensions of the freight item.

22. The method of claim 19, wherein analyzing the first set of images and the second set of images comprises at least one of analyzing objects associated with the freight item for damage and analyzing objects associated with the freight item for tampering.

23. The method of claim 19, wherein the first and second sides of the freight item do not overlap one another.

\* \* \* \* \*